United States Patent
Weh et al.

(10) Patent No.: US 10,744,984 B2
(45) Date of Patent: Aug. 18, 2020

(54) PEDAL TRAVEL SIMULATOR, HYDRAULIC BLOCK INCLUDING SUCH A PEDAL TRAVEL SIMULATOR, AND METHOD FOR SETTING A CHARACTERISTIC CURVE OF SUCH A PEDAL TRAVEL SIMULATOR

(71) Applicant: Robert Bosch GmbH, Stuttgart (DE)

(72) Inventors: Andreas Weh, Sulzberg (DE); Chris Anderson, Paris (FR); Harald Guggenmos, Immenstadt/Seifen (DE); Matthias Mayr, Rettenberg (DE); Raynald Sprocq, Esbly (FR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/347,012

(22) PCT Filed: Oct. 5, 2017

(86) PCT No.: PCT/EP2017/075283
§ 371 (c)(1),
(2) Date: May 2, 2019

(87) PCT Pub. No.: WO2018/091195
PCT Pub. Date: May 24, 2018

(65) Prior Publication Data
US 2019/0270438 A1    Sep. 5, 2019

(30) Foreign Application Priority Data
Nov. 16, 2016  (DE) .................. 10 2016 222 567

(51) Int. Cl.
*B60T 8/40* (2006.01)
*F15B 15/24* (2006.01)

(52) U.S. Cl.
CPC .............. *B60T 8/409* (2013.01); *F15B 15/24* (2013.01)

(58) Field of Classification Search
CPC ...... B60T 8/4081; B60T 8/409; B60T 8/4086; B60T 7/042; F15B 15/24
See application file for complete search history.

(56) References Cited

U.S. PATENT DOCUMENTS 9,079,570 B2 * 7/2015 Sellinger ................ B60T 7/042

FOREIGN PATENT DOCUMENTS

| DE | 102014213732 A1 | 1/2016 |
|----|-----------------|--------|
| DE | 102014215308 A1 | 2/2016 |
| JP | 2008284941 A | 11/2008 |
| JP | 2009143302 A | 7/2009 |
| JP | 2014 031067 A | 2/2014 |

OTHER PUBLICATIONS

International Search Report dated Jan. 18, 2018 of the corresponding International Application PCT/EP2017/075283 filed Oct. 5, 2017.

* cited by examiner

*Primary Examiner* — Abiy Teka
(74) *Attorney, Agent, or Firm* — Norton Rose Fulbright US LLP; Gerard Messina

(57) ABSTRACT

A hydraulic block includes pedal travel simulator for a hydraulic power-assisted vehicle braking system includes a piston that is displaceable in a cylinder, a piston spring that acts on the piston against the displacement, and a stroke limiter limiting the displacement. A characteristic curve of such a pedal travel simulator is set.

17 Claims, 2 Drawing Sheets

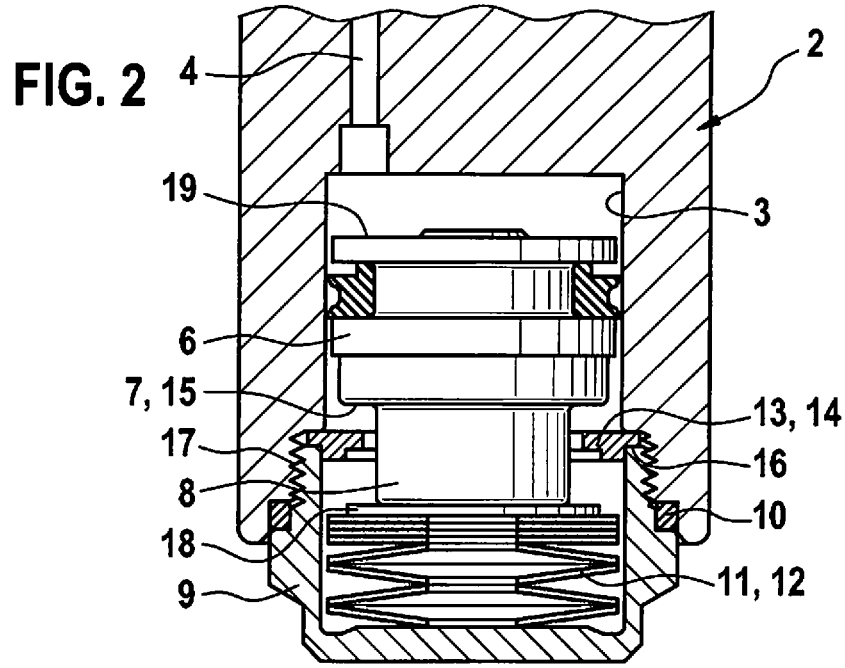
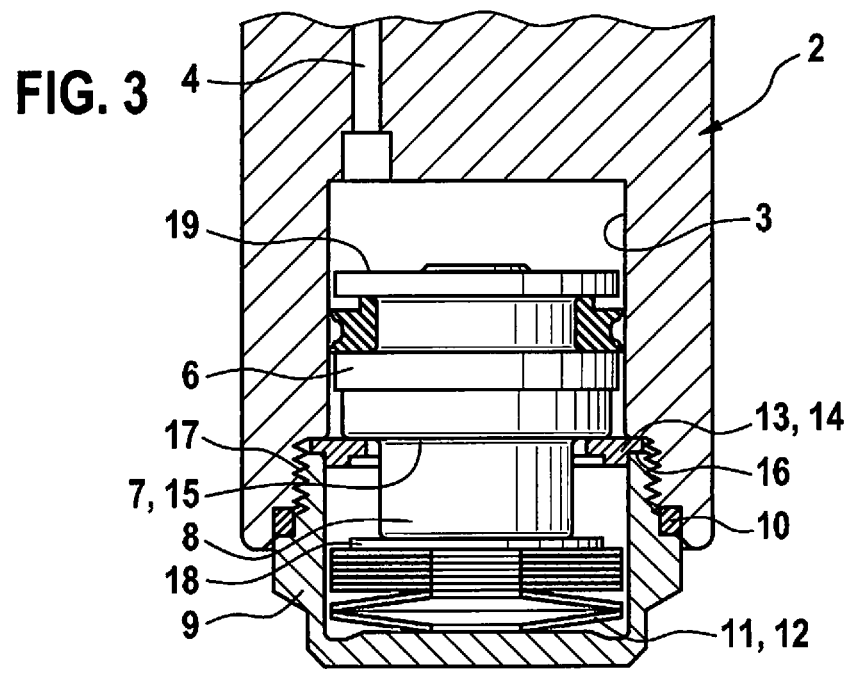

PEDAL TRAVEL SIMULATOR, HYDRAULIC BLOCK INCLUDING SUCH A PEDAL TRAVEL SIMULATOR, AND METHOD FOR SETTING A CHARACTERISTIC CURVE OF SUCH A PEDAL TRAVEL SIMULATOR

CROSS-REFERENCE TO RELATED APPLICATIONS

The present application is the national stage of International Pat. App. No. PCT/EP2017/075283 filed Oct. 5, 2017, and claims priority under 35 U.S.C. § 119 to DE 10 2016 222 567.7, filed in the Federal Republic of Germany on Nov. 16, 2016, the content of each of which are incorporated herein by reference in their entireties.

FIELD OF THE INVENTION

The present invention relates to a pedal travel simulator.

BACKGROUND

Pedal travel simulators in power-assisted hydraulic vehicle braking systems allow a pedal travel (for a parking brake, a lever travel) when a master brake cylinder is actuated. During a power-assisted actuation, the master brake cylinder is used as a setpoint generator for a hydraulic brake pressure that is generated not with the master brake cylinder, but, rather, with external energy using a hydropump, for example. During power braking, the master brake cylinder is hydraulically disconnected from the vehicle braking system, for example by closing a valve, and, when actuated, displaces brake fluid into the pedal travel simulator.

A pedal travel simulator generally has a cylinder and a piston that is displaceable in the cylinder, as well as a piston spring that acts on the piston against a displacement direction. During a power-assisted actuation of a vehicle braking system, the pedal travel simulator is hydraulically connected to a master brake cylinder, which, when actuated, displaces brake fluid into the cylinder of the pedal travel simulator, as the result of which the piston is displaced in the cylinder, against an elastic force of the piston spring.

SUMMARY

According to an example embodiment of the present invention, a pedal travel simulator includes a stroke limiter for its piston, which limits a stroke of the piston, i.e., a displacement of the piston in the cylinder. The stroke limiter can be used, for example, to prevent the piston spring from "bottoming out." "Bottoming out" means a design-related maximal deflection of the piston spring, for example due to abutment of windings of a helical compression spring, or flat abutment of disk springs.

The stroke limiter is preferably formed by a perforated disk that holds disk springs, as a piston spring, in a cylinder cover of the pedal travel simulator and/or removes a load from a piston that presses with force against the perforated disk via a thread of the cylinder cover into a cylinder of the pedal travel simulator.

The pedal travel simulator is preferably integrated into a hydraulic block of a slip controller of a hydraulic vehicle braking system, in particular a power-assisted vehicle braking system. Such hydraulic blocks are known per se, and are generally cuboidal metal blocks with borings corresponding to a hydraulic circuit diagram of the vehicle braking system or the slip controller of a vehicle braking system. The hydraulic blocks are fitted with solenoid valves, hydropumps, and other hydraulic components of the slip controller. Such blocks are known per se, and are not explained in greater detail here.

In an example embodiment, the piston is plastically compressed, i.e., plastically shortened in the displacement direction, to a length that is a function of a length of the cylinder, a height of a cylinder cover that can be present, and/or a position of the perforated disk in the cylinder or in the cylinder cover. A characteristic curve of the pedal travel simulator is set in this way. The characteristic curve is a hydraulic pressure that is a function of an accommodated brake fluid volume. The characteristic curve is set individually, i.e., as a function of the particular cylinder, cylinder cover, perforated disk, piston spring, and piston. Tolerances are minimized in this way.

The present invention is described in greater detail below with reference to an example embodiment that is illustrated in the drawings.

BRIEF DESCRIPTION OF THE DRAWINGS

FIGS. 2 and 3 show a partial section of the hydraulic block of FIG. 1 in the area of the pedal travel simulator, with the vehicle braking system actuated, according to an example embodiment of the present invention.

DETAILED DESCRIPTION

Figure 1:
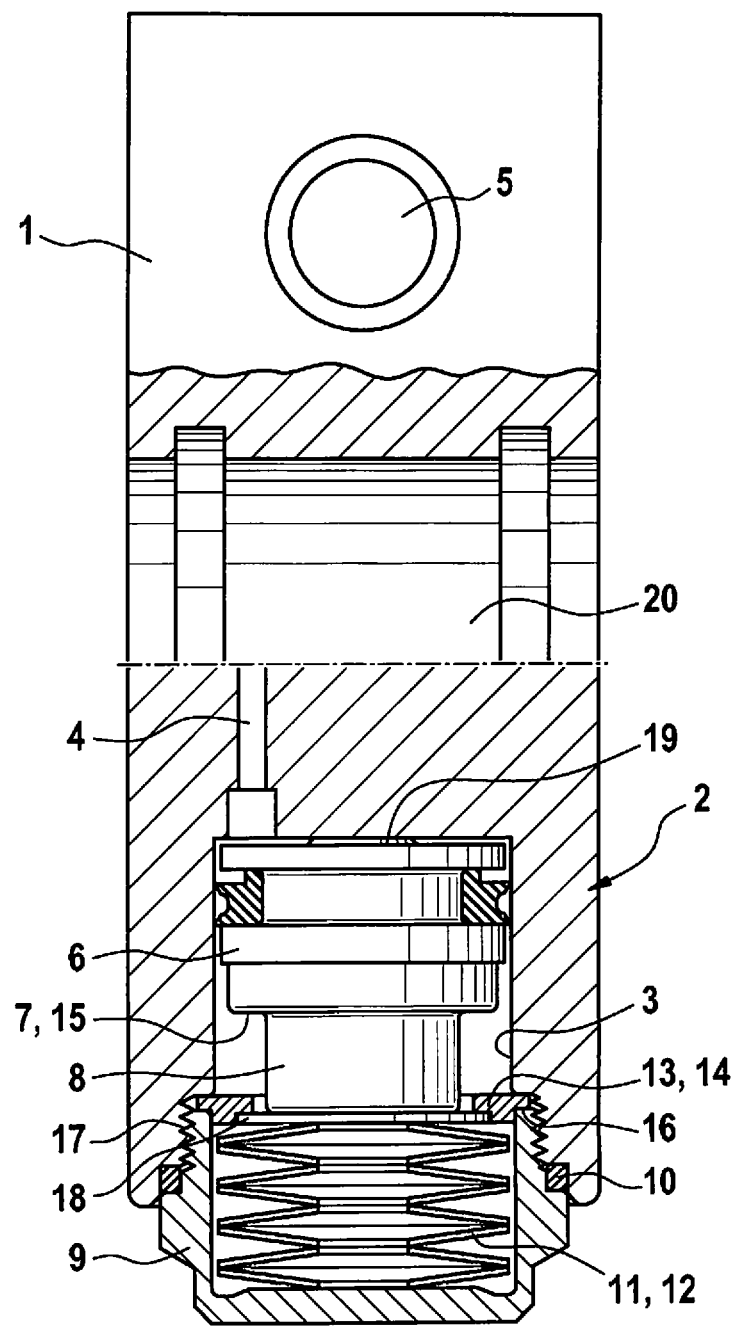
FIG. 1 shows a longitudinal section of a hydraulic block of a slip controller of a hydraulic power-assisted vehicle braking system with a pedal travel simulator according to an example embodiment of the present invention.

Hydraulic block 1 illustrated in FIG. 1 is provided for a slip controller and a power-assisted actuation of a hydraulic power-assisted vehicle braking system, not illustrated. Hydraulic block 1 is a cuboidal metal block, which, with the exception of a pedal travel simulator 2, to be explained, is shown without fittings. Hydraulic block 1 includes a boring, not visible in the drawing, corresponding to a hydraulic circuit diagram of the vehicle braking system. The hydraulic block is fitted with hydraulic components, not shown, for the power-assisted actuation and the slip controller, such as solenoid valves, a master brake cylinder including one or multiple pistons, and a power assist cylinder including a piston and pedal travel simulator 2, which are hydraulically connected through the boring according to the hydraulic circuit diagram of the vehicle braking system. Due to the fact that a master brake cylinder is integrated into hydraulic block 1, it is necessary only to connect hydraulic wheel brakes to hydraulic block 1 via brake lines. Such hydraulic blocks 1 are known, and are not explained in greater detail here.

Hydraulic block 1 includes a cylindrical blind hole as a cylinder 3 of pedal travel simulator 2, the base of which opens into a borehole 4 that hydraulically connects pedal travel simulator 2 to a master brake cylinder bore 5. A piston 6 is axially displaceably accommodated in cylinder 3, and, via an annular step 7, merges into an extension 8 having a smaller diameter.

A cylindrical tube-shaped cylinder cover 9 that is closed at one end is screwed into an opening of cylinder 3 of pedal travel simulator 2 and sealed off with a sealing ring 10. Disk springs 11, forming a piston spring 12, are accommodated in cylinder cover 9. Disk springs 11 are arranged in cylinder cover 9 as a stack, and are oppositely oriented in alternation.

Disk springs 11 are supported in cylinder cover 9, and press piston 6 of pedal travel simulator 2 at its extension 8 against the base of cylinder 3.

A perforated disk 13 is situated at an open side of cylinder cover 9, and, in the example embodiment, is pressed into the open side of cylinder cover 9 and thus fastened to cylinder cover 9. Perforated disk 13 holds disk springs 11 in cylinder cover 9 until cylinder cover 9 is screwed into the opening of cylinder 3. Cylinder cover 9 together with perforated disk 13 and disk springs 11 forms a pre-assembleable module. Perforated disk 13 can also be fastened to cylinder cover 9 in some other way, for example by crimping.

Extension 8 of piston 6 extends through perforated disk 13, and, at a maximum piston stroke, abuts with its annular step 7 against perforated disk 13 on the open side of cylinder cover 9 or in the opening of cylinder 3 (FIG. 3; FIG. 2 shows an intermediate position of piston 6 between a starting position with no pressure on pedal travel simulator 1, shown in FIG. 1, and the maximum piston stroke). Perforated disk 13 forms a stroke limiter 14 for piston 6, and annular step 7 of piston 6 forms a stop 15 that cooperates with stroke limiter 14 and limits a stroke of piston 6. Against an action of pressure on piston 6, perforated disk 13, which forms stroke limiter 14, is axially supported with an annular step 16 on the open side of cylinder cover 9. An axial force, exerted on perforated disk 13 that forms stroke limiter 14, by piston 6 via its annular step 7 when pressure acts on piston 6 is introduced into cylinder 3, by a form fit, from perforated disk 13 to cylinder cover 9 and via thread 17, by which cylinder cover 9 is screwed into a mating thread in the opening of cylinder 3.

Perforated disk 13 that forms stroke limiter 14 prevents "bottoming out" of disk springs 11 that form piston spring 12. "Bottoming out" means that disk springs 12 are pressed flat together and contact one another essentially over their entire surface area. This is avoided by perforated disk 13, as stroke limiter 14, that is situated at the open side of cylinder cover 9. An axial length of cylinder cover 9 is coordinated with disk springs 11 in such a way that they do not "bottom out." For a larger or smaller number of disk springs 11, cylinder covers 9 of different lengths can be used. It is thus possible to adapt pedal travel simulator 2 to different master brake cylinders.

Cylinder cover 9 radially guides disk springs 11, which form piston springs 12, outwardly at their outer edges in such a way that they are deformable axially for spring loading. Cylinder cover 9 is made of a wear-resistant material, in particular steel, whereas hydraulic block 1 can be made of a less wear-resistant material, for example aluminum or an aluminum alloy.

A disk as a wear protection element 18 is situated between disk springs 11 and piston 6. The disk is made of a wear-resistant material, in particular steel. The disk prevents direct contact of disk springs 11 with piston 6, which can be made of a less wear-resistant material, for example aluminum or an aluminum alloy. Wear protection element 18 prevents disk springs 11 from scratching or scraping against piston 6.

For setting a characteristic curve of pedal travel simulator 2, piston 6 is plastically compressed, i.e., shortened to a setpoint length by plastic deformation. The characteristic curve is an accommodation of brake fluid in cylinder 3 that is a function of a hydraulic pressure in cylinder 3 of pedal travel simulator 2, and that is a function, among other things, of a spring stiffness or a spring characteristic curve of piston spring 12. The hydraulic pressure in cylinder 3 is proportional to an elastic force exerted by piston spring 12 on piston 6, and a brake fluid volume accommodated by cylinder 3 is proportional to a displacement of piston 6 in cylinder 3. The characteristic curve of pedal travel simulator 2 determines a force/displacement dependency when the master brake cylinder is actuated, and thus, a pedal characteristic of a power-assisted vehicle braking system, including pedal travel simulator 1, during a power-assisted actuation.

For the plastic compression, piston 6 has a low elevation 19 at one end, to which the plastic shortening of piston 6 is essentially limited. The length of piston 6 determines a pretensioning of disk springs 11 that form piston spring 12, or also a free travel ("jump-in") of piston 6 at the start of its displacement, until it elastically deforms disk springs 11. Before cylinder cover 9 is screwed into the opening of cylinder 3, a depth of cylinder 3 and a length of cylinder cover 9 and of the disk spring packet are measured, and piston 6 is correspondingly compressed. Other characteristic indicators of pedal travel simulator 2 can be measured instead. Individual measurements are carried out; i.e., the components that are subsequently assembled to form pedal travel simulator 2 are measured. In this way, the characteristic curve of pedal travel simulator 2 is individually set for each pedal travel simulator 2, and manufacturing tolerances are minimized.

As mentioned above, hydraulic block 1 includes a master brake cylinder bore 5, which in the example embodiment has a stepped diameter and includes circumferential grooves. A master brake cylinder, not illustrated, is pressed into master brake cylinder bore 5. One or multiple pistons, not illustrated, are introduced into the master brake cylinder, and for actuation of the master brake cylinder or the vehicle braking system, one of the pistons is displaceable via a brake pedal, not illustrated, and the other piston(s) is/are displaceable by the action of pressure.

For the power-assisted actuation, hydraulic block 1 includes a power assist cylinder bore 20 that is situated in a different section plane than pedal travel simulator 2, and of which only a half-section is thus visible in the figures. In the figures, the section is offset in such a way that pedal travel simulator 2 is seen in the axial section, and power assist cylinder bore 20 is seen as a half-section. A power assist cylinder, not shown, into which a piston is displaceably accommodated, is pressed into power assist cylinder bore 20. For a power-assisted actuation of the vehicle braking system, the piston is displaced in the power assist cylinder by an electric motor, not illustrated, via a reduction gear unit and a screw drive. The electric motor is screwed onto hydraulic block 1. During a power-assisted actuation, the master brake cylinder, as stated, is used as a setpoint generator, and a brake pressure is regulated by controlling a displacement travel of the piston in the power assist cylinder, and/or with solenoid valves.

What is claimed is:

1. A pedal travel simulator for a hydraulic power-assisted vehicle braking system, the simulator comprising:
    a cylinder;
    a piston that is displaceable in a displacement direction within the cylinder;
    a stroke limiter that limits a maximum displacement of the piston in the displacement direction; and
    a piston spring that acts on the piston in a direction against the displacement direction;
    wherein:
    (I) the cylinder includes a hollow cylinder cover in which the piston spring is accommodated, at least one of on and in which the stroke limiter is situated, and that includes a thread with which the cylinder cover is screwed into a mating thread of another part of the cylinder; and/or (II) (a) with respect to the displacement direction, the piston spring is arranged downstream of the stroke limiter and of the piston, (b) the piston includes a circumferential annular step that forms a stop, (c) the piston and the stroke limiter are arranged relative to each other for the stop to contact an upstream surface of the stroke limiter that faces against the displacement direction when the piston is displaced by the maximum displacement, and (d) the piston spring, when in an extended state, is pressed against a downstream surface of the stroke limiter that faces in the displacement direction and that is downstream of the upstream surface of the stroke limiter.

2. The pedal travel simulator of claim 1, wherein the stroke limiter limits the maximum displacement of the piston in such a way that the piston spring cannot be fully compressed by the piston.

3. The pedal travel simulator of claim 1, further comprising a wear protector situated between the piston and the piston spring.

4. The pedal travel simulator of claim 1, wherein the cylinder includes the hollow cylinder cover in which the piston spring is accommodated, at least one of on and in which the perforated disk is situated, and that includes the thread with which the cylinder cover is screwed to the mating thread of the another part of the cylinder.

5. The pedal travel simulator of claim 1, wherein:
(a) with respect to the displacement direction, the piston spring is arranged downstream of the stroke limiter and of the piston;
(b) the piston includes the circumferential annular step that forms the stop;
(c) the piston and the stroke limiter are arranged relative to each other for the stop to contact the upstream surface of the stroke limiter that faces against the displacement direction when the piston is displaced by the maximum displacement; and
(d) the piston spring, when in the extended state, is pressed against the downstream surface of the stroke limiter that faces in the displacement direction and that is downstream of the upstream surface of the stroke limiter.

6. The pedal travel simulator of claim 5, wherein the piston includes, on one side of its annular step, an extension against which the piston spring rests, and the stroke limiter is a perforated disk through which the extension of is displaced by the maximum displacement; the piston extends.

7. The pedal travel simulator of claim 6, wherein the cylinder includes the hollow cylinder cover in which the piston spring is accommodated, at least one of on and in which the perforated disk is situated, and that includes the thread with which the cylinder cover is screwed to the mating thread of the another part of the cylinder.

8. The pedal travel simulator of claim 7, wherein the perforated disk holds the piston spring in the cylinder cover.

9. The pedal travel simulator of claim 7, wherein the perforated disk is axially supported on the cylinder cover and, when the piston rests against the perforated disk, against the piston.

10. The pedal travel simulator of claim 7, wherein the perforated disk:
holds the piston spring in the cylinder cover; and
is axially supported on the cylinder cover and, when the piston rests against the perforated disk, against the piston.

11. The pedal travel simulator of claim 7, wherein the piston spring is formed of a set of disk springs that are radially guided in the cylinder cover.

12. A hydraulic block for a hydraulic power-assisted vehicle braking system, the hydraulic block comprising:
a pedal travel simulator that includes:
    a cylinder;
    a piston that is displaceable in a displacement direction within the cylinder;
    a stroke limiter that limits a maximum displacement of the piston in the displacement direction; and
    a piston spring that acts on the piston in a direction against the displacement direction;
wherein:
    (I) the cylinder includes a hollow cylinder cover in which the piston spring is accommodated, at least one of on and in which the stroke limiter is situated, and that includes a thread with which the cylinder cover is screwed into a mating thread of another part of the cylinder; and/or
    (II) (a) with respect to the displacement direction, the piston spring is arranged downstream of the stroke limiter and of the piston, (b) the piston includes a circumferential annular step that forms a stop, (c) the piston and the stroke limiter are arranged relative to each other for the stop to contact an upstream surface of the stroke limiter that faces against the displacement direction when the piston is displaced by the maximum displacement, and (d) the piston spring, when in an extended state, is pressed against a downstream surface of the stroke limiter that faces in the displacement direction and that is downstream of the upstream surface of the stroke limiter.

13. The hydraulic block of claim 12, further comprising a master brake cylinder bore.

14. The hydraulic block of claim 12, further comprising a power assist cylinder bore.

15. The hydraulic block of claim 12, further comprising a master brake cylinder bore and a power assist cylinder bore.

16. A method for setting a characteristic curve of a pedal travel simulator of a hydraulic power-assisted vehicle braking system, wherein the simulator includes (a) a cylinder, (b) a piston that is displaceable in a displacement direction within the cylinder, (c) a stroke limiter that limits a maximum displacement of the piston in the displacement direction, and (d) a piston spring that acts on the piston in a direction against the displacement direction, the method comprising:
individually adapting the piston to the cylinder by plastic compression;
wherein:
    (I) the cylinder includes a hollow cylinder cover in which the piston spring is accommodated, at least one of on and in which the stroke limiter is situated, and that includes a thread with which the cylinder cover is screwed into a mating thread of another part of the cylinder; and/or
    (II) (a) with respect to the displacement direction, the piston spring is arranged downstream of the stroke limiter and of the piston, (b) the piston includes a circumferential annular step that forms a stop, (c) the piston and the stroke limiter are arranged relative to each other for the stop to contact an upstream surface of the stroke limiter that faces against the displacement direction when the piston is displaced by the maximum displacement, and (d) the piston spring, when in an extended state, is pressed against a downstream surface of the stroke limiter that faces in the displacement direction and that is downstream of the upstream surface of the stroke limiter.

17. The method of claim 16, wherein the adapting is of the piston to a cylinder cover of the cylinder.

\* \* \* \* \*